(12) United States Patent
Huang et al.

(10) Patent No.: US 8,365,935 B2
(45) Date of Patent: Feb. 5, 2013

(54) VEHICLE AND CONTAINER BODY STRUCTURE THEREOF

(75) Inventors: T. H. Huang, Qingdao (CN); Robert Wang, Qingdao (CN); Ryan Xu, Qingdao (CN); Eric Shan, Qingdao (CN); Jack Zhang, Qingdao (CN); Steven Zhang, Qingdao (CN)

(73) Assignees: China International Marine Containers (Group) Ltd., Guangdong (CN); Qingdao CIMC Reefer Trailer Co., Ltd., Shandong (CN); Qingdao CIMC Reefer Container Manufacture Co., Ltd., Shandong (CN); Qingdao CIMC Special Reefer Co., Ltd., Shandong (CN)

( * ) Notice: Subject to any disclaimer, the term of this patent is extended or adjusted under 35 U.S.C. 154(b) by 195 days.

(21) Appl. No.: 12/699,187

(22) Filed: Feb. 3, 2010

(65) Prior Publication Data

US 2010/0213740 A1  Aug. 26, 2010

(30) Foreign Application Priority Data

Feb. 20, 2009 (CN) .......................... 2009 1 0009378

(51) Int. Cl.
*B65D 90/02* (2006.01)

(52) U.S. Cl. ........................................ 220/1.5; 220/4.33

(58) Field of Classification Search ................. 220/4.33, 220/1.5, 4.28
See application file for complete search history.

(56) References Cited

U.S. PATENT DOCUMENTS

| | | | | |
|---|---|---|---|---|
| 5,762,222 A * | 6/1998 | Liu | ............................... | 220/1.5 |
| 6,095,715 A * | 8/2000 | Hulls | ............................. | 403/403 |
| 7,311,216 B2 * | 12/2007 | Donnelly et al. | .............. | 220/1.5 |
| 7,401,844 B2 * | 7/2008 | Lemmons | .................. | 296/186.1 |

* cited by examiner

*Primary Examiner* — Stephen Castellano
(74) *Attorney, Agent, or Firm* — McDonnell Boehnen Hulbert & Berghoff LLP

(57) ABSTRACT

The present invention discloses a container body structure and a vehicle having the same, the container body structure comprising: a front wall, a rear wall, a left side panel, a right side panel, a roof sheet and a floor, each of them being a separate individual part; and connectors being provided at peripheries of the front wall, the rear wall, the left side panel, the right side panel, the roof sheet and the floor respectively, for cooperating with each other during assembling, in which assembly and disassembly of the container body structure can be realized through assembly and disassembly of the connectors for the front wall, the rear wall, the left side panel, the right side panel, the roof sheet and the floor. Owing to the characteristics of the container body structure of the present invention, the production, transportation and subsequent maintenance of the container body may be simplified, and thus production efficiency may be improved and maintenance cost may be reduced.

12 Claims, 5 Drawing Sheets

VEHICLE AND CONTAINER BODY STRUCTURE THEREOF

CROSS REFERENCE TO RELATED APPLICATIONS

The present application claims a priority to Chinese patent application No. 200910009378.7 filed on Feb. 20, 2009, which is herein incorporated by reference in entirety thereof.

FIELD OF THE INVENTION

The present invention relates to a container body structure which is convenient to assemble and maintain, and in particular, to a connecting and assembling arrangement for a container body of a van, a van trailer or a semi-trailer carriage used as a refrigerator vehicle, an insulated vehicle or a dry cargo vehicle and for a container body of a refrigerated or insulated container.

BACKGROUND OF THE INVENTION

FIG. 1 is a structural diagram of a traditional container body.

As shown in FIG. 1, generally, a container body structure of a vehicle, such as a van, a van trailer or a semi-trailer carriage in refrigerated, thermal or dry cargo type and a refrigerated or thermal freight container, may be divided into six parts, i.e. a roof sheet 1, a left side panel 2, a right side panel 3, a floor 4, a rear wall 5 and a front wall 6, according to six surfaces of a hexahedron.

At present, most of the container body structures are integrated structures primarily characterized in that each part of the container body is not separated, and thus the function and the structural characteristics of each part could be exhibited only after the six parts are assembled into a complete container body. Moreover, assembly of these parts needs many connections and involves complicated processes or techniques.

The deficiencies of the above-mentioned container body structures lie in that, since the roof sheet 1, the left side panel 2, the right side panel 3, the floor 4, the rear wall 5 and the front wall 6 are formed into an integrated structure after assembly, these parts of the above-mentioned container body structure can not be easily separated and/or disassembled, and a large number of connecting members would be involved. Accordingly, during the maintenance process of the container body, repair and replacement of one of component parts will more or less involve other members, so that the maintaining process becomes more complex.

BRIEF SUMMARY OF THE INVENTION

In view of the above deficiencies in the prior art, an object of the present invention is to provide a container body structure of a vehicle, in which a roof sheet, a left side panel, a right side panel, a floor, a rear wall and a front wall are separated complete members, so that the container body structure may be optimized, assembly process may be simplified, and maintenance cost may be lowered.

In order to achieve the above-mentioned object, the present invention provides a container body structure of a vehicle comprising a front wall, a rear wall, a left side panel, a right side panel, a roof sheet and a floor; wherein each of the front wall, the rear wall, the left side panel, the right side panel, the roof sheet and the floor may be a separate individual part; connectors may be provided at peripheries of the front wall, the rear wall, the left side panel, the right side panel, the roof sheet and the floor respectively, for cooperating with each other during assembling, and assembly and disassembly of the container body structure can be realized through assembly and disassembly of the connectors for the front wall, the rear wall, the left side panel, the right side panel, the roof sheet and the floor.

Preferably, the connectors may be assembled together by means of fasteners, welded or adhered together, or assembled together by means of snap-in elements during the assembly of the container body structure.

Preferably, each two adjacent connectors of said connectors may be provided with side wings oppositely extending therebetween and overlapping with each other for assembling the fasteners.

Preferably, the front wall, the rear wall, the left side panel, the right side panel, the roof sheet and the floor themselves each are formed with the connectors, or the connectors may be separate components respectively independent of the front wall, the rear wall, the left side panel, the right side panel, the roof sheet and the floor.

Preferably, each of the front wall, the rear wall, the left side panel, the right side panel, the roof sheet and the floor may be a separate frame part.

Preferably, each of the front wall, the rear wall, the left side panel, the right side panel, the roof sheet and the floor may be in a form of a foaming sandwich plate which comprises an outer plate, an inner plate and a foaming layer disposed between the outer plate and the inner plate.

Preferably, two front wall corner posts provided on the left and right sides of the front wall may be formed into front wall corner post connectors, respectively; two rear wall corner posts provided on the left and right sides of the rear wall may be formed into rear wall corner post connectors, respectively; side panel front end connectors and side panel rear end connectors are provided at front and rear ends of the left side panel and the right side panel, respectively; each of the front wall corner post connectors may have a cross section in a shape of arc with opposing hooks at two ends thereof, and have a side wing extending toward the side panel front end connector; each of the side panel front end connectors and the side panel rear end connectors may have an X-shaped cross section, each of the side panel front end connectors may have a side wing extending toward the respective front wall corner post connector, each of the side panel rear end connectors has a side wing extending toward the respective rear wall corner post connector, the two rear wall corner post connectors both may be made of a pipe with a square cross section, and each of them may have a side wing extending toward the respective side panel rear end connector; the side wings of the two front wall corner post connector and the side wings of the side panel front end connectors may be overlapped with each other correspondingly and assembled together by means of the fasteners, the side wings of the two rear wall corner post connectors and the side wings of the side panel rear end connectors may be overlapped with each other correspondingly and assembled together by means of the fasteners.

Preferably, roof sheet side rails provided on the left and right sides of the roof sheet may be formed into a roof sheet left end connector and a roof sheet right end connector, respectively; a left side panel top rail provided at a top end of the left side panel may be formed into a left side panel top end connector; a right side panel top rail provided at a top end of the right side panel may be formed into a right side panel top end connector; the roof sheet left end connector and the roof sheet right end connector may both have side wings inclining downward and extending toward outside of the container at lower ends thereof, respectively; the left side panel top end connector and the right side panel top end connector may both have side wings inclining upward and extending toward insider of the container body at top ends thereof, respectively; the side wing of the roof sheet left end connector and the side wing of the left side panel top end connector may be overlapped with each other and assembled together by means of the fasteners; and the side wing of the roof sheet right end connector and the side wing of the right side panel top end connector may be overlapped with each other and assembled together by means of the fasteners.

Preferably, a roof sheet front end rail provided at a front end of the roof sheet may be formed into a roof sheet front end connector, and a roof sheet rear end rail provided at a rear end of the roof sheet may be formed into a roof sheet rear end connector; a front end upper rail provided at an upper end of the front wall may be formed into a front wall top end connector; a rear wall top rail provided at an upper end of the rear wall may be formed into a rear wall top end connector; the roof sheet front end connector may have a side wing inclining downward and extending toward outside of the container body at a lower end thereof, the front wall top end connector may have a side wing inclining upward and extending toward inside of the container body at a top end thereof; the side wing of the front wall top end connector and the side wing of the roof sheet front end connector may be overlapped with each other and assembled together by means of the fasteners; the roof sheet rear end connector may have a Z-shaped cross section, and may have a side wing extending toward the rear wall top end connector, the rear wall top end connector may have a side wing extending toward the roof sheet rear end connector; the side wing of the roof sheet front end connector and the side wing of the front wall top end connector may be overlapped with each other and assembled together by means of the fasteners, and the side wing of the roof sheet rear end connector and the side wing of the rear wall top end connector may be overlapped with each other and assembled together by means of the fasteners.

In order to achieve the above object, the present invention also provides a vehicle comprising any one of the container body structures of the present invention set forth above.

The present invention still follows a general structure division mode of a container body, so that the container body is divided into six parts. However, different from the prior art, the present invention introduces a concept regarding segmental assembly and rapid fitting into manufacturing process of trailer industry. In the main concept of the present invention, each part constituting the container body can be separated from each other with the specific container body structure described in the present invention. That is to say, each part has become a part with separate individual frame structure before being assembled into the container body. Therefore, these six parts can be assembled into a container body of a trailer by simple assembly process. Each part also can be packaged and delivered as a qualified maintenance spare parts, and transported to various large maintenance sites for applying to maintenance and replacement of old container body and components thereof. Each part has specific connectors which can function as connection in each part. Owing to these connectors, the six parts can be conveniently connected together by the fasteners in the later stage of assembly process of the container body.

Owing to the characteristics of the container body structure of the present invention, the production, transportation and subsequent maintenance of the container body may be simplified, and thus production efficiency may be improved and maintenance cost may be reduced.

In addition, the advantages and beneficial effects of the present invention in comparison with the prior art lie in the following aspects: 1) it is possible to adopt segmental assembly and rapid fitting mode, so as to improve the productive efficiency of the container body; 2) each part is a separate individual part, which is beneficial to production and transportation in a form of package for each part; 3) each part has specific connectors and can be connected with fasteners, which is beneficial to detach and replace it integrally during maintenance process; and 4) each part is a separate individual part and can be connected with general fasteners, so that it is possible to adopt a container body of a trailer which is produced in a local site and assemble in a strange site in order to reduce transportation costs.

DETAILED DESCRIPTION OF THE INVENTION

Hereinafter, the present invention will be further described in conjunction with embodiments and drawings.

It will be more apparent for the container body structure of the present invention to exhibit advantages in maintenance process. In the present invention, the container body structure will be divided into six separate individual parts, i.e., a roof sheet, a right side panel, a right side panel, a floor, a rear wall and a front wall. Each of the six parts can be detached from the container body by a simple operation, and thus maintenance and replacement on any components and elements may be performed in one of the six parts. Accordingly, the maintenance of the container body is considerably facilitated and simplified, since the container body does not have to be maintained as a whole and each part can be repaired and/or maintained separately.

Figure 1:
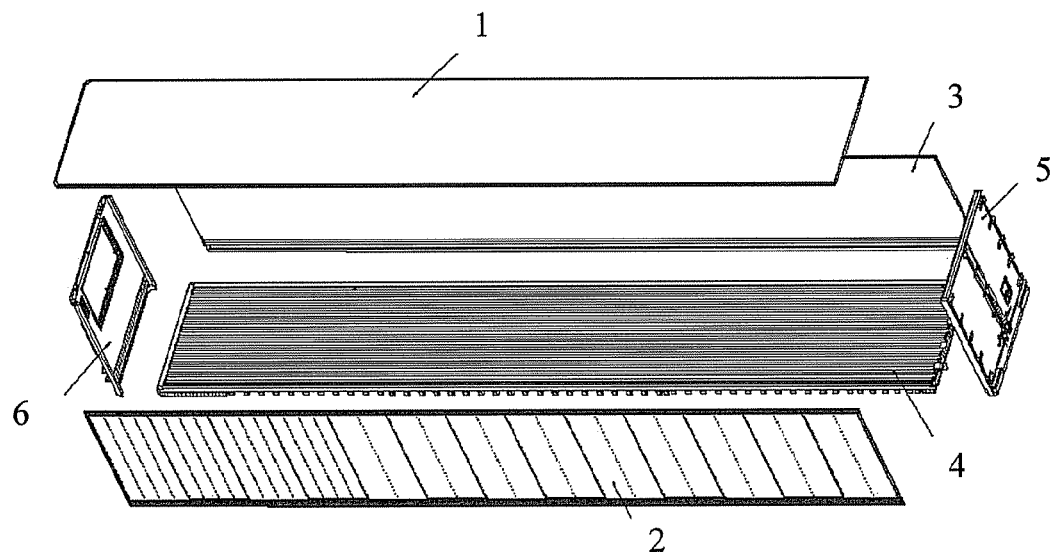
FIG. 1 is a diagram of a traditional container body structure.

Referring to FIG. 1, the container body structure of the vehicle in the present invention also comprises six parts, i.e. a roof sheet 1, a left side panel 2, a right side panel 3, a floor 4, a rear wall 5 and a front wall 6, each of which is a separate individual part, and the container body structure of the vehicle in the present invention is also formed by assembling the roof sheet 1, the left side panel 2, the right side panel 3, the floor 4, a rear wall 5 and the front wall 6.

Each of the roof sheet 1, the left side panel 2, the right side panel 3, the floor 4, a rear wall 5 and the front wall 6 may be a individual frame part, or may be in a form of a foaming sandwich plate (not illustrated in the drawings) which comprises an outer plate, an inner plate and a foaming layer disposed between the outer plate and the inner plate.

In order to conveniently perform assembly and disassembly among the roof sheet 1, the left side panel 2, the right side panel 3, the floor 4, a rear wall 5 and the front wall 6, connectors which may cooperate with each other may be provided at peripheries thereof, such that the roof sheet 1, the left side panel 2, the right side panel 3, the floor 4, a rear wall 5 and the front wall 6 can be assembled together by means of these connectors.

During assembling the container body structure of the present invention, the connectors of the present invention may be assembled together by fasteners, or may be welded or adhered together, or assembled together by snap-in elements. In the present invention, there is no limit to the assembling manner of the connectors, as long as assembly and disassembly of the roof sheet 1, the left side panel 2, the right side panel 3, the floor 4, a rear wall 5 and the front wall 6 can be conveniently realized, so that assembly and disassembly of the container body can be realized by the assembly and disassembly of the connectors.

The roof sheet 1, the left side panel 2, the right side panel 3, the floor 4, a rear wall 5 and the front wall 6 themselves each may be formed with respective connectors, and may be assembled together by fasteners, so that the roof sheet 1, the left side panel 2, the right side panel 3, the floor 4, a rear wall 5 and the front wall 6 may be assembled not only at a local site but also at another different site after transportation in package, which consequently realize the purpose of segmental transportation and rapidly assembly.

As an alternative solution, the connectors of the roof sheet 1, the left side panel 2, the right side panel 3, the floor 4, a rear wall 5 and the front wall 6 may be not affiliated to any one part, but may be additionally installed on the roof sheet 1, the left side panel 2, the right side panel 3, the floor 4, a rear wall 5 and the front wall 6, or may be connected during assembling the container body. Nevertheless, the connecting function of the connectors exhibited can not be changed.

Hereinafter, the roof sheet 1, the left side panel 2, the right side panel 3, the floor 4, a rear wall 5 and the front wall 6 themselves formed with connectors will be described. In accordance with the above description, it will be apparent to the person skilled in the art that it also can be realized that connectors are not affiliated to any one parts.

In order to facilitate the assembly of the roof sheet 1, the left side panel 2, the right side panel 3, the floor 4, a rear wall 5 and the front wall 6, side wings may be oppositely extended between each two adjacent connectors, and these side wings may be overlapped with each other and be used for assembling fasteners.

Figure 2A:
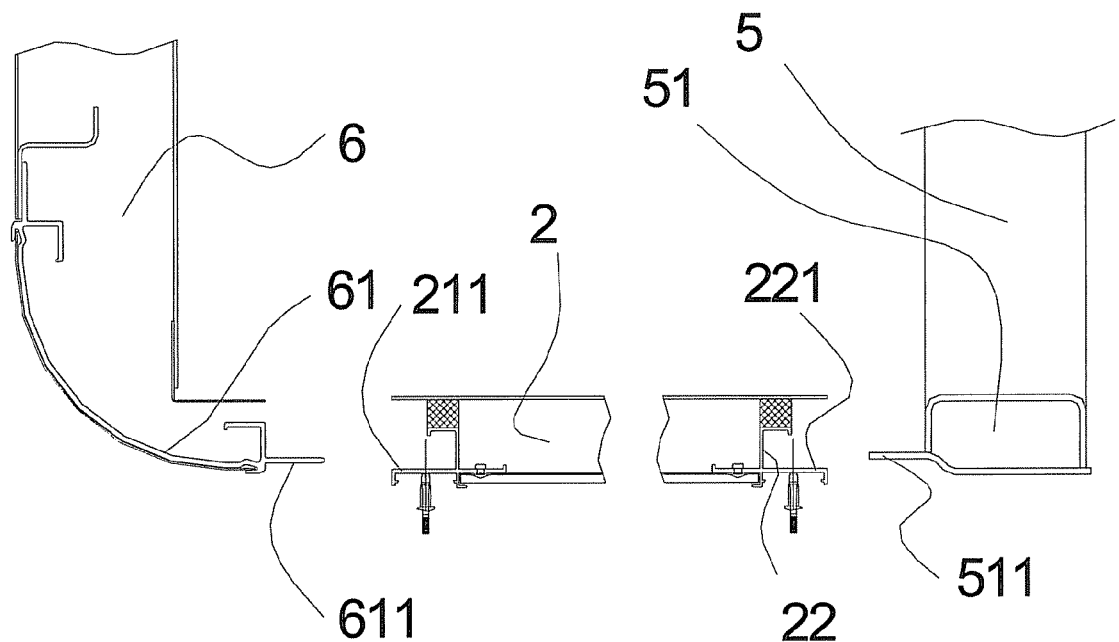
FIG. 2A illustrates connections between the front wall and the left side panel as well as between the rear wall and the left side panel.
Figure 2B:
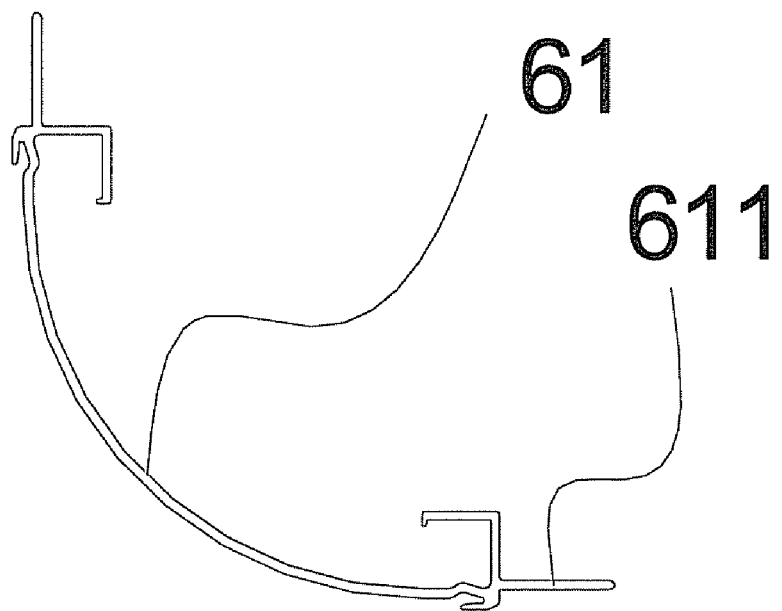
FIG. 2B is a cross-section diagram illustrating a front wall corner post connector of the present invention.
Figure 2C:
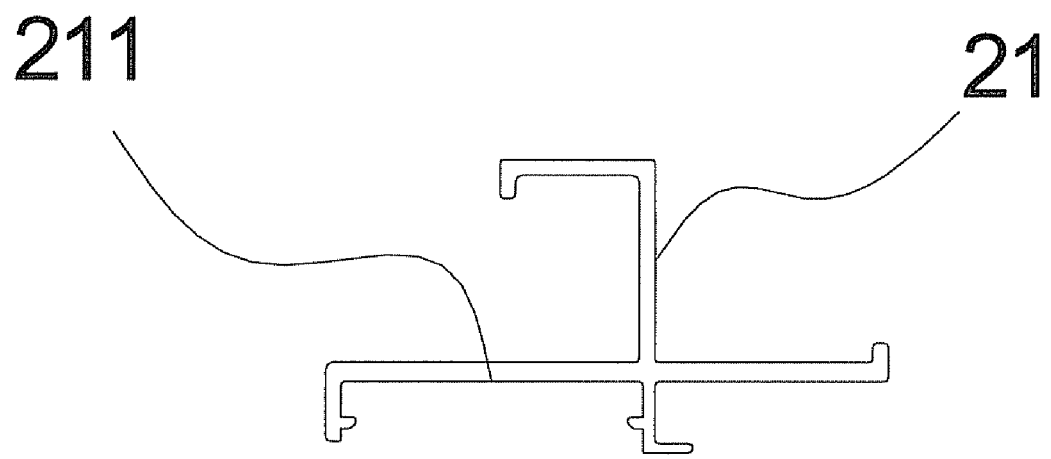
FIG. 2C is a cross-section diagram illustrating a side plane front end connector of the present invention.

FIG. 2A illustrates connections between the front wall and the left side panel as well as between the rear wall and the left side panel. FIG. 2B is a cross-section diagram illustrating a front wall corner post connector of the present invention. FIG. 2C is a cross-section diagram illustrating a side plane front end connector of the present invention.

As shown in FIG. 2A, two front wall corner posts, which are provided on the left and right sides of the front wall 6, are formed into front wall corner post connectors (only a front wall corner post connector 61 formed by a left front wall corner post is illustrated in the Drawings), respectively; two rear wall corner posts, which are provided on the left and right sides of the rear wall, are formed into rear wall corner post connectors (only a left rear wall corner post connector 51 formed by a left rear wall corner post is illustrated in the Drawings), respectively; and side panel front end connectors 21 and side panel rear end connectors 22 are provided at the front and rear ends of the left side panel 2 and the right side panel 3, respectively.

As shown in FIG. 2A and FIG. 2B, the front wall corner post connector 61 has a cross section in a shape of arc with opposing hooks at two ends thereof, and has a side wing 611 extending toward the side panel front end connector 21.

As shown in FIG. 2A and FIG. 2C, the side panel front end connector 21 and the side panel rear end connector 22 have the same shapes and are symmetrically provided. The side panel front end connector 21 has an X-shaped cross section and has a side wing 211 extending toward the front wall corner post connector 61, and the side panel rear end connector 22 has a side wing 221 extending toward the rear wall corner post connector 51.

As shown in FIG. 2A, each of two rear wall corner post connectors 51 (only one is illustrated in the drawings) is made of a pipe with a square cross section, and each has a side wing 511 extending toward the side panel rear end connector 22.

When the right side panel 2, the right side panel 3, the rear wall 5 and the front wall 6 need to be assembled together, the side wings 611 of the two front wall corner post connectors 61 and the side wings 211 of the side panel front end connectors 21 are overlapped with each other correspondingly and assembled together by fasteners, such as rivets and the like; and the side wings 511 of the two rear wall corner post connectors 51 and the side wings 221 of the side panel rear end connector 22 are overlapped with each other correspondingly, and assembled together by fasteners, such as rivets and the like.

Since the left panel 2, the right panel 3, the front wall 6 and the rear wall 5 are separate individual structures before being assembled into a container body, it is merely required to partially position and perform fastening by means of rivets during assembly process. Upon performing the assembly process, the left side panel 2 and the right side panel 3 may overlap the front wall 6 and the rear wall 5 respectively, which is beneficial to control the overall size of the container body, efficiently reduce the difficulty of assembling and improve productivity effect. The connectors shown in FIGS. 2A, 2B and 2C not only function as frame structural members of the left panel 2, the right panel 3, the front wall 6 and the rear wall 5, but also function as connectors for connecting the left side panel 2 and the right side panel 3 with the front wall 6 and the rear wall 5. The connectors used in the present invention are not limited to the structural form or outline dimensions as shown in FIGS. 2A, 2B and 2C.

Figure 3A:
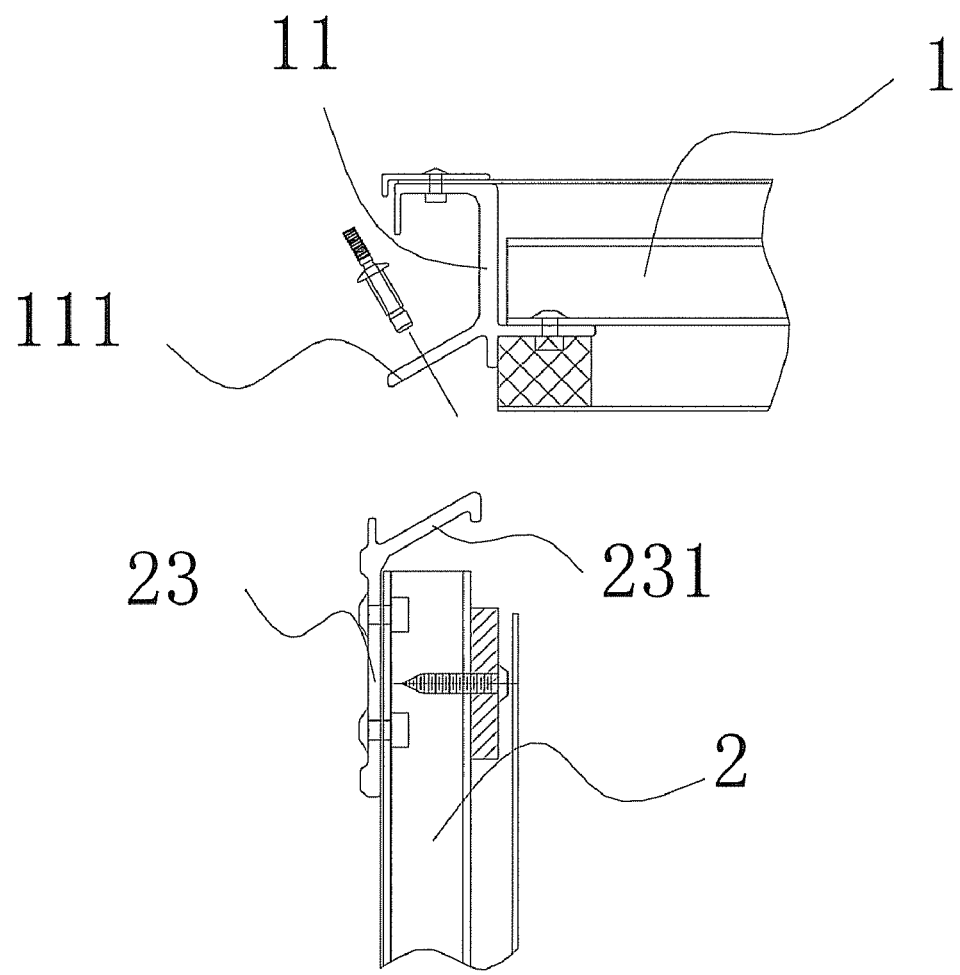
FIG. 3A illustrates connection between a left side panel and a roof sheet of the present invention.
Figure 3B:
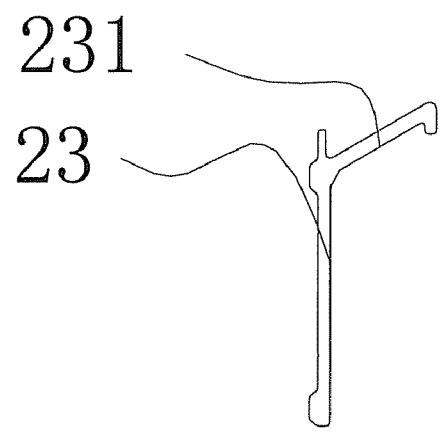
FIG. 3B is a cross-section diagram illustrating a roof sheet left end connector of the present invention.
Figure 3C:
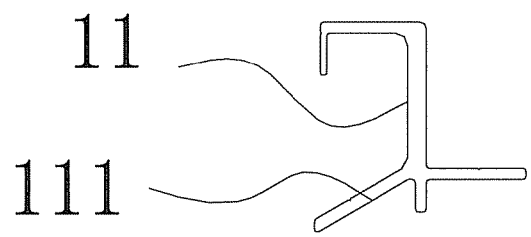
FIG. 3C is a cross-section diagram illustrating a left side panel top end connector of the present invention.

FIG. 3A illustrates the connection between the left side panel and a roof sheet in the present invention. FIG. 3B is a cross-section diagram illustrating a roof sheet left end connector of the present invention. FIG. 3C is a cross-section diagram illustrating a left side panel top end connector of the present invention.

As shown in FIGS. 3A, 3B, and 3C, roof sheet side rails, which are provided on the left and right sides of the roof sheet 1, are formed into a roof sheet left end connector 11 and a roof sheet right end connector (not illustrated, but it has the same structure and function as that of the roof sheet left end connector 11), respectively; a left side panel top rail, which is provided at a top end of the left side panel 2, is formed into a left side panel top end connector 23; and a right side panel top rail, which is provided at a top end of the right side panel 3, is formed into a right side panel top end connector (not illustrated, but it has the same structure and function as that of the left side panel top end connector 23). The roof sheet left end connector 11 has a side wing 111 inclining downward and extending toward outside of the container body at a lower end of the roof sheet left end connector 11, and the left side panel top end connector 23 has a side wing 231 inclining upward and extending toward inside of the container body at a top end of the left side panel top end connector 23; the side wing 111 of the roof sheet left end connector 11 and the side wing 231 of the left side panel top end connector 23 are overlapped with each other and assembled together by means of fasteners, such as rivets and the like. Although not illustrated in the drawings, the side wing of the roof sheet right end connector and the side wing of the right side panel top end connector are also overlapped with each other and assembled together by means of the fasteners.

The connection between the roof sheet left end connector 11 and the left side panel top end connector 23 is formed by means of engagement of inclined surfaces. When the roof sheet 1 and the left side panel 2 are assembled together, such a connecting structure has a function of self-positioning. Specifically, this connecting structure can automatically align the middle surface by means of its structural characteristics of self-inclined surfaces under a vertical pressure generated form the weight of the roof sheet 1. Therefore, such a connection has a relative large improvement in comparison with a plane-to-plane butt joint used by the container body of the conventional trailer. The connectors shown in FIGS. 3A, 3B and 3C are not only frame structural members of the side panels and the roof sheet but also are specific connectors for connecting the side panels and the roof sheet. The connectors used in the present invention are not limited to the structural form or outline dimensions as shown in FIGS. 3A, 3B and 3C.

Figure 4A:
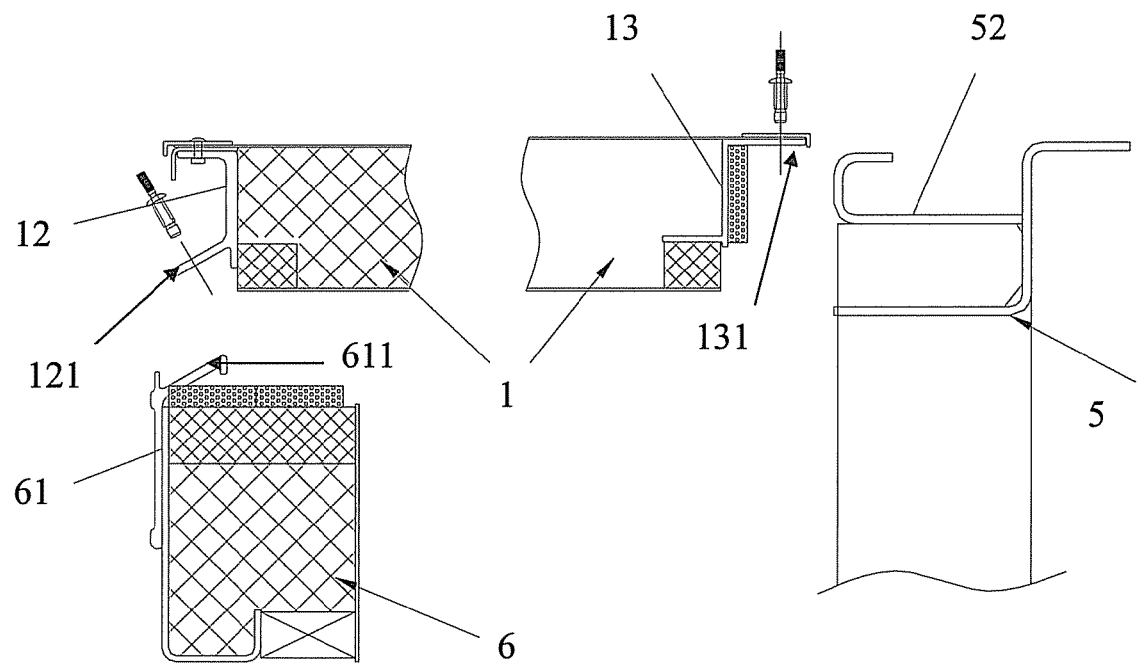
FIG. 4A illustrates connections between the roof sheet and the front wall as well as between the roof sheet and the front wall of the present invention.
Figure 4B:
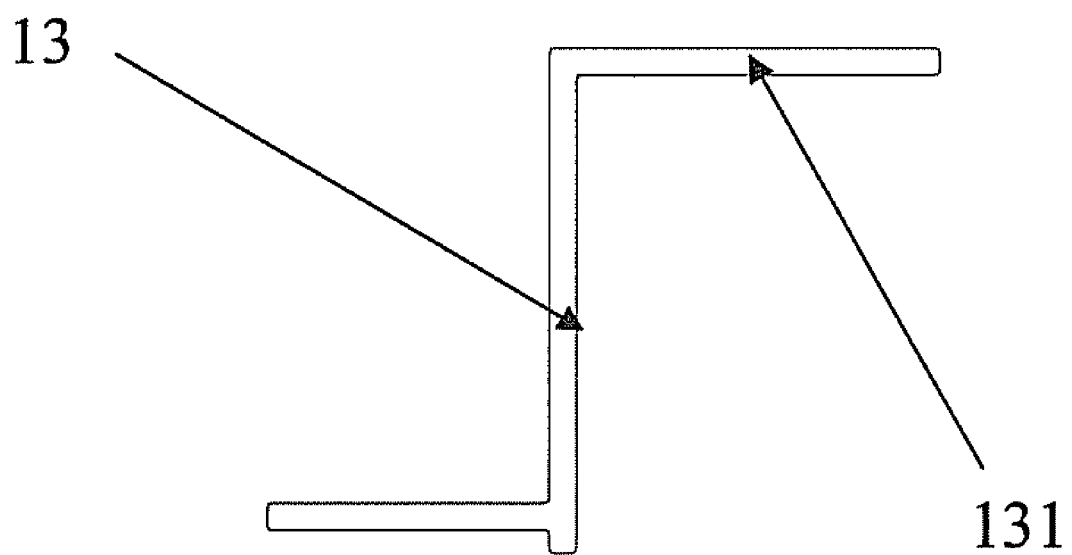
FIG. 4B is a cross-section diagram illustrating a roof sheet rear end connector of the present invention.

FIG. 4A illustrates the connection between the roof sheet and the front wall and the connection between the roof sheet and the rear wall. FIG. 4B is a cross-section diagram illustrating a roof sheet rear end connector of the present invention.

As shown in FIG. 4A and FIG. 4B, in the present invention, a roof sheet front end rail, which is provided at a front end of the roof sheet 1, is formed into a roof sheet front end connector 12; a roof sheet rear end rail, which is provided at a rear end of the roof sheet 1, is formed into a roof sheet rear end connector 13; a front end upper rail, which is provided at an upper end of the front wall 6, is formed into a front wall top end connector 62; and a rear wall top rail, which is provided at an upper end of the rear wall 5, is formed into a rear wall top end connector 52.

The roof sheet front end connector 12 has a side wing 121 inclining downward and extending toward outside of the container body at a lower end of roof sheet front end connector 12, and the front wall top end connector 62 has a side wing 621 inclining upward and extending toward inside of the container body at a top end of the front wall top end connector 62. The side wing 621 of the front wall top end connector 62 and the side wing 121 of the roof sheet front end connector 12 are overlapped with each other and assembled together by means of fasteners, such as rivets and the like.

The roof sheet rear end connector 13 has a Z-shaped cross section and a side wing 131 extending toward the rear wall top end connector 52, the rear wall top end connector 52 has a side wing 521 extending toward the roof sheet rear end connector 13. The side wing 131 of roof sheet rear end connector 13 and the side wing 521 of the rear wall top end connector 52 are overlapped with each other and assembled together by means of fasteners, such as rivets and the like. Moreover, the side wing 121 of the roof sheet front end connector 12 and the side wing 621 of the front wall top end connector 62 are overlapped with each other and assembled together by means of fasteners, such as rivets and the like.

The connection between roof side rails and the front wall is similar to that between the roof sheet and the left and right side panels. The connection between the roof sheet and the rear wall belongs to an overlapped joint, which is beneficial to control the overall size of the container body and improve the assembling efficiency. The specific connectors shown in FIGS. 4A and 4B do not only function as frame structural members located between the roof sheet and the front wall as well as between the roof sheet and the rear wall, but also function as specific connectors for connecting the front wall and the side panels. These connectors used in the present invention are not limited to the structural form or outline dimensions as shown in FIGS. 4A and 4B.

In order to achieve the object of the present invention, the present invention also provides a vehicle comprising any one of the above-mentioned container structure.

Although the present invention has been described with reference to certain preferred embodiments, the present invention is not limited to the preferred embodiment and may be variously modified within the scope of the technical idea presented in the specification and drawings and the following claim. It will be apparent to the person skilled in the art that any modifications, variations and the equivalents thereof within the same technical spirit of the invention will be construed as falling in the protection scope of the present invention.

What is claimed is:

1. A container body structure of a vehicle, comprising a front wall, a rear wall, a left side panel, a right side panel, a roof sheet and a floor, wherein each of the front wall, the rear wall, the left side panel, the right side panel, the roof sheet and the floor is a separate individual part; connectors are provided at peripheries of the front wall, the rear wall, the left side panel, the right side panel, the roof sheet and the floor respectively, for cooperating with each other during assembling the connectors being assembled together by means of fasteners, by welding by adhering together, by assembling together by means of snap-in elements, during the assembly of the container body structure, and assembly and disassembly of the container body structure can be realized through assembly and disassembly of the connectors for the front wall, the rear wall, the left side panel, the right side panel, the roof sheet and the floor wherein each two adjacent connectors of said connectors are provided with side wings oppositely extending therebetween and overlapping with each other wherein two front wall corner posts provided on the left and right sides of the front wall are formed into front wall corner post connectors, respectively; two rear wall corner posts provided on the left and right sides of the rear wall are formed into rear wall corner post connectors, respectively; side panel front end connectors and side panel rear end connectors are provided at front and rear ends of the left side panel and the right side panel, respectively; each of the front wall corner post connectors has a cross section in a shape of arc with opposing hooks at two ends thereof, and has a side wing extending toward the side panel front end connector; each of the side panel front end connectors and the side panel rear end connectors has an X-shaped cross section, each of the side panel front end connectors has a side wing extending toward the respective front wall corner post connector, each of the side panel rear end connectors has a side wing extending toward the respective rear wall corner post connector, the two rear wall corner post connectors both are made of a pipe with a square cross section, and each of them has a side wing extending toward the respective side panel rear end connector; the side wings of the two front wall corner post connector and the side wings of the side panel front end connectors are overlapped with each other correspondingly and assembled together by means of the fasteners, the side wings of the two rear wall corner post connectors and the side wings of the side panel rear end connectors are overlapped with each other correspondingly and assembled together by means of the fasteners.

2. The container body structure of the vehicle according to claim 1, wherein the front wall, the rear wall, the left side panel, the right side panel, the roof sheet and the floor themselves each are formed with the connectors, or the connectors are separate components respectively independent of the front wall, the rear wall, the left side panel, the right side panel, the roof sheet and the floor.

3. The container body structure of the vehicle according to claim 1, wherein each of the front wall, the rear wall, the left side panel, the right side panel, the roof sheet and the floor is a separate frame part.

4. The container body structure of the vehicle according to claim 1, wherein each of the front wall, the rear wall, the left side panel, the right side panel, the roof sheet and the floor is in a form of a foaming sandwich plate which comprises an outer plate, an inner plate and a foaming layer disposed between the outer plate and the inner plate.

5. The container body structure of the vehicle according to claim 1, wherein roof sheet side rails provided on the left and right sides of the roof sheet are formed into a roof sheet left end connector and a roof sheet right end connector, respectively; a left side panel top rail provided at a top end of the left side panel is formed into a left side panel top end connector; a right side panel top rail provided at a top end of the right side panel is formed into a right side panel top end connector; the roof sheet left end connector and the roof sheet right end connector both have side wings inclining downward and extending toward outside of the container at lower ends thereof, respectively; the left side panel top end connector and the right side panel top end connector both have side wings inclining upward and extending toward inside of the container body at top ends thereof, respectively; the side wing of the roof sheet left end connector and the side wing of the left side panel top end connector are overlapped with each other and assembled together by means of the fasteners; and the side wing of the roof sheet right end connector and the side wing of the right side panel top end connector are lapped with each other and assembled together by means of the fasteners.

6. The container body structure of the vehicle according to claim 1, wherein a roof sheet front end rail provided at a front end of the roof sheet is formed into a roof sheet front end connector, and a roof sheet rear end rail provided at a rear end of the roof sheet is formed into a roof sheet rear end connector; a front end upper rail provided at an upper end of the front wall is formed into a front wall top end connector; a rear wall top rail provided at an upper end of the rear wall is formed into a rear wall top end connector; the roof sheet front end connector has a side wing inclining downward and extending toward outside of the container body at a lower end thereof, the front wall top end connector has a side wing inclining upward and extending toward inside of the container body at a top end thereof; the side wing of the front wall top end connector and the side wing of the roof sheet front end connector are overlapped with each other and assembled together by means of the fasteners; the roof sheet rear end connector has a Z-shaped cross section, and has a side wing extending toward the rear wall top end connector, the rear wall top end connector has a side wing extending toward the roof sheet rear end connector; and the side wing of the roof sheet rear end connector and the side wing of the rear wall top end connector are lapped with each other and assembled together by means of the fasteners.

7. A vehicle having a container body structure comprising a front wall, a rear wall, a left side panel, a right side panel, a roof sheet and a floor, wherein each of the front wall, the rear wall, the left side panel, the right side panel, the roof sheet and the floor is a separate individual part; connectors are provided at peripheries of the front wall, the rear wall, the left side panel, the right side panel, the roof sheet and the floor respectively, for cooperating with each other during assembling the connectors being assembled together by means of fasteners, by welding by adhering together, by assembling together by means of snap-in elements, during the assembly of the container body structure, and assembly and disassembly of the container body structure can be realized through assembly and disassembly of the connectors for the front wall, the rear wall, the left side panel, the right side panel, the roof sheet and the floor wherein each two adjacent connectors of said connectors are provided with side wings oppositely extending therebetween and overlapping with each other wherein two front wall corner posts provided on the left and right sides of the front wall are formed into front wall corner post connectors, respectively; two rear wall corner posts provided on the left and right sides of the rear wall are formed into rear wall corner post connectors, respectively; side panel front end connectors and side panel rear end connectors are provided at front and rear ends of the left side panel and the right side panel, respectively; each of the front wall corner post connectors has a cross section in a shape of arc with opposing hooks at two ends thereof, and has a side wing extending toward the side panel front end connector; each of the side panel front end connectors and the side panel rear end connectors has an X-shaped cross section, each of the side panel front end connectors has a side wing extending toward the respective front wall corner post connector, each of the side panel rear end connectors has a side wing extending toward the respective rear wall corner post connector, the two rear wall corner post connectors both are made of a pipe with a square cross section, and each of them has a side wing extending toward the respective side panel rear end connector; the side wings of the two front wall corner post connector and the side wings of the side panel front end connectors are overlapped with each other correspondingly and assembled together by means of the fasteners, the side wings of the two rear wall corner post connectors and the side wings of the side panel rear end connectors are overlapped with each other correspondingly and assembled together by means of the fasteners.

8. The vehicle according to claim 7, wherein the front wall, the rear wall, the left side panel, the right side panel, the roof sheet and the floor themselves each are formed with the connectors, or the connectors are separate components respectively independent of the front wall, the rear wall, the left side panel, the right side panel, the roof sheet and the floor.

9. The vehicle according to claim 7, wherein each of the front wall, the rear wall, the left side panel, the right side panel, the roof sheet and the floor is a separate frame part.

10. The vehicle according to claim 7, wherein each of the front wall, the rear wall, the left side panel, the right side panel, the roof sheet and the floor is in a form of a foaming sandwich plate which comprises an outer plate, an inner plate and a foaming layer disposed between the outer plate and the inner plate.

11. The vehicle according to claim 7, wherein roof sheet side rails provided on the left and right sides of the roof sheet are formed into a roof sheet left end connector and a roof sheet right end connector, respectively; a left side panel top rail provided at a top end of the left side panel is formed into a left side panel top end connector; a right side panel top rail provided at a top end of the right side panel is formed into a right side panel top end connector; the roof sheet left end connector and the roof sheet right end connector both have side wings inclining downward and extending toward outside of the container at lower ends thereof, respectively; the left side panel top end connector and the right side panel top end connector both have side wings inclining upward and extending toward inside of the container body at top ends thereof, respectively; the side wing of the roof sheet left end connector and the side wing of the left side panel top end connector are overlapped with each other and assembled together by means of the fasteners; and the side wing of the roof sheet right end connector and the side wing of the right side panel top end connector are lapped with each other and assembled together by means of the fasteners.

12. The vehicle according to claim 7, wherein a roof sheet front end rail provided at a front end of the roof sheet is formed into a roof sheet front end connector, and a roof sheet rear end rail provided at a rear end of the roof sheet is formed into a roof sheet rear end connector; a front end upper rail provided at an upper end of the front wall is formed into a front wall top end connector; a rear wall top rail provided at an upper end of the rear wall is formed into a rear wall top end connector; the roof sheet front end connector has a side wing inclining downward and extending toward outside of the container body at a lower end thereof, the front wall top end connector has a side wing inclining upward and extending toward inside of the container body at a top end thereof; the side wing of the front wall top end connector and the side wing of the roof sheet front end connector are overlapped with each other and assembled together by means of the fasteners; the roof sheet rear end connector has a Z-shaped cross section, and has a side wing extending toward the rear wall top end connector, the rear wall top end connector has a side wing extending toward the roof sheet rear end connector; and the side wing of the roof sheet rear end connector and the side wing of the rear wall top end connector are lapped with each other and assembled together by means of the fasteners.

* * * * *